(12) United States Patent
Dalal et al.

(10) Patent No.: US 6,654,143 B1
(45) Date of Patent: Nov. 25, 2003

(54) PRINTER CHARACTERIZATION ADJUSTMENT FOR DIFFERENT PAPERS

(75) Inventors: Edul N. Dalal, Webster, NY (US);
Thyagarajan Balasubramanian, Webster, NY (US); D. Rene Rasmussen, Pittsford, NY (US); Gaurav Sharma, Webster, NY (US); Mark Q. Shaw, Austin, TX (US); Michael E. Farrell, Ontario, NY (US); David C. Robinson, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/429,444

(22) Filed: Oct. 28, 1999

(51) Int. Cl.[7] ............................................... G06F 15/00
(52) U.S. Cl. ......................... 358/1.9; 358/1.12; 347/14
(58) Field of Search ..................... 358/1.1, 1.5, 1.9, 358/1.11, 1.12, 1.13, 1.14, 1.15; 347/14, 16, 17

(56) References Cited

U.S. PATENT DOCUMENTS 5,751,303 A * 5/1998 Erickson et al. ............. 347/16

* cited by examiner

Primary Examiner—Mark Wallerson
(74) Attorney, Agent, or Firm—Fay, Sharpe, Fagan, Minnich & McKee, LLP

(57) ABSTRACT

A method of adjusting an image production system to account for a variable property of a desired output medium includes storing a reference characterization of at least one measured value associated with a reference output medium. An output value, adjusted for the variable property of the desired output medium, is determined based on data including the reference characterization of the reference output medium, for example stored in color lookup tables, color rendering dictionaries, or the like. Based on the adjusted output value determined, the desired output medium is then printed or otherwise marked using the output value.

19 Claims, 6 Drawing Sheets

PRINTER CHARACTERIZATION ADJUSTMENT FOR DIFFERENT PAPERS

BACKGROUND OF THE INVENTION

The present invention relates to the imaging arts. It finds particular application in conjunction with characterizing output image output devices to accommodate variable qualities of different output media, and will be described with particular reference thereto.

Color printers are characterized by printing a number of colors with given CMYK values, measuring the colors obtained and generating a characterization function from CMYK to some device independent coordinate system, such as CIELAB. The final color correction that inverts the characterization function is often implemented as a 3D look-up table that maps CIELAB to CMYK.

Each characterization of a printer or image output terminal (e.g. xerographic, or lithographic machines) must be done for a specific substrate. If a user decides to use a substrate different from that used in the characterization, the color output error will depend upon the magnitude of the differences between the properties of variables inherent in the substrate used in the characterization and that used for printing.

Presently, many users ignore the change in substrate and use the original characterization on each new substrate. This approach is far from satisfactory and typically causes errors in the fidelity of the output characterization of the printer, the only solution currently available is to repeat the entire characterization procedure for each new substrate. Beyond requiring instruments not readily available to end users, this is a difficult process.

There are many factors that make characterizing a printer difficult. Some factors are uncontrollable and often unpredictable, printer drift is one such factor. The printer may change daily, or even hourly depending on the environmental conditions and throughput. Location sensitivity is another unpredictable factor, how the print will vary depending on where the toner is laid down on the substrate.

The colorants used in the printer are of great importance, and existing printer characterization models rely upon building a model of calorimetric response as a function of colorant and cross-colorant combinations, as specified by reflectance or tristimulus values.

Even if one were able to build a printer that did not drift, that had uniform location sensitivity, with a stable, predictable set of colorants, there is still one variable that must be accounted for the print substrate.

The substrate is one of the most variable factors involved in the printer characterization. The printer's tone response is influenced by variables such as substrate color, weight, morphology, dimensional stability, coating technology, to name but a few. Each characteristic will in itself vary depending on the substrate. Thus, the printer's performance is, in large measure, dependant on variable characteristics of the output media (e.g. paper, card stock, or even cloth) Peak fidelity is accordingly only achieved through the difficult process of complete recharacterization.

BRIEF SUMMARY OF THE INVENTION

The above problem is solved in a method of adjusting a printing device in response to a variable property of an output medium. The variable may include color, reflectance, texture, weight, and/or a combination thereof associated with the output medium. The method includes storing a reference characterization of at least one measured value associated with a reference output medium. An output value adjusted for the variable property of the desired output medium is then determined based on data including the reference characterization of the reference medium. Based on the determined output value, the desired output value is printed on the desired output medium.

In accordance with another aspect of the present invention, an image production system includes a storage device for storing a reference color characterization of a reference substrate. The system further includes a mechanism for receiving a value associated with a second substrate. A processor in the system then determines an output value adjusted for the variable property of a desired output medium based on data including a reference characterization of the reference output medium.

One advantage of the present invention resides in adjusting a printer characterization based on a property of the output medium, including color, texture and/or weight, without having to repeat an entire characterization process.

Another advantage of the present invention resides in enhanced fidelity of an output image with respect to an input image, with minimum, if any, user involvement.

Still further advantages and benefits of the present invention will become apparent to those of ordinary skill in the art upon reading and understanding the following detailed description of the preferred embodiments.

BRIEF DESCRIPTION OF THE DRAWINGS

The invention may take physical form in certain parts and arrangements of parts, and in various steps and arrangements of steps. The drawings are only for purposes of illustrating the preferred embodiments and are not to be construed as limiting the invention.

DETAILED DESCRIPTION OF THE PREFERRED EMBODIMENTS

Figure 1:
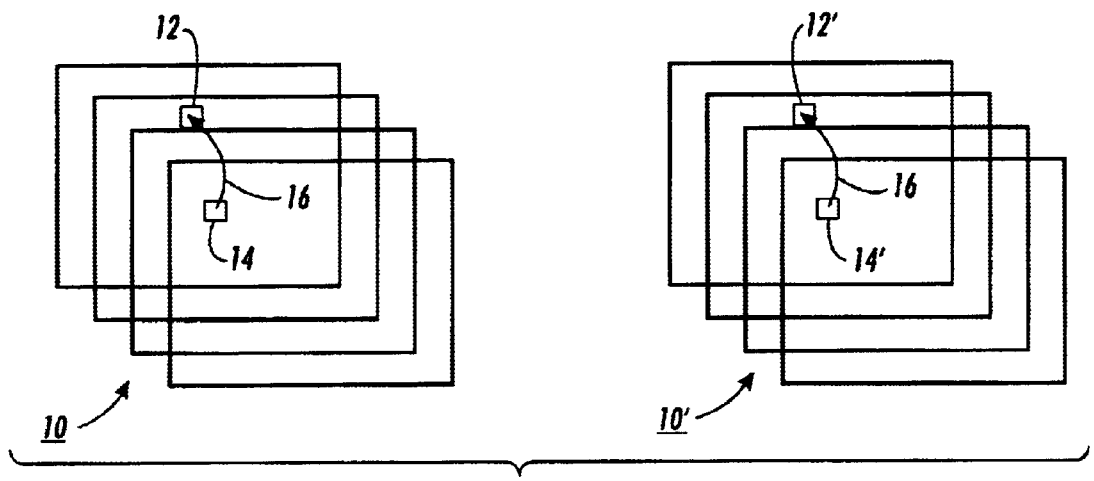
FIG. 1 is an exemplary conversion from a reference medium to a desired output medium based on a calculated difference between theoretical values and measured values sufficient to practice the present invention.

With reference now to FIG. 1, a reference characterization 10 preferably includes at least one value 12 measured on a reference output medium during an initial or complete printer characterization. In order to print or output the most faithful rendition of the measured value 12 on a desired substrate having a variable property, for example, color, some computations are performed. In one embodiment, a theoretical value 14 is calculated for the reference output medium. A relationship 16 is then derived between the measured value 12 and the theoretical value 14. Preferably then, a theoretical value 14' for the desired output medium is calculated. The relationship 16 is then applied to the theoretical value 14' calculated for the desired output medium 10'. The application of the relationship 16 the desired output medium 10' produces an output value 12'adjusted for the variable property, in this example, color. Those skilled in the art can appreciate that in addition to the procedure set out above, the relationship can alternately be defined between the theoretical value for the reference substrate and a theoretical value for the desired substrate. This relationship can be then applied to the measured value of the reference medium to achieve the desired output value.

Figure 2:
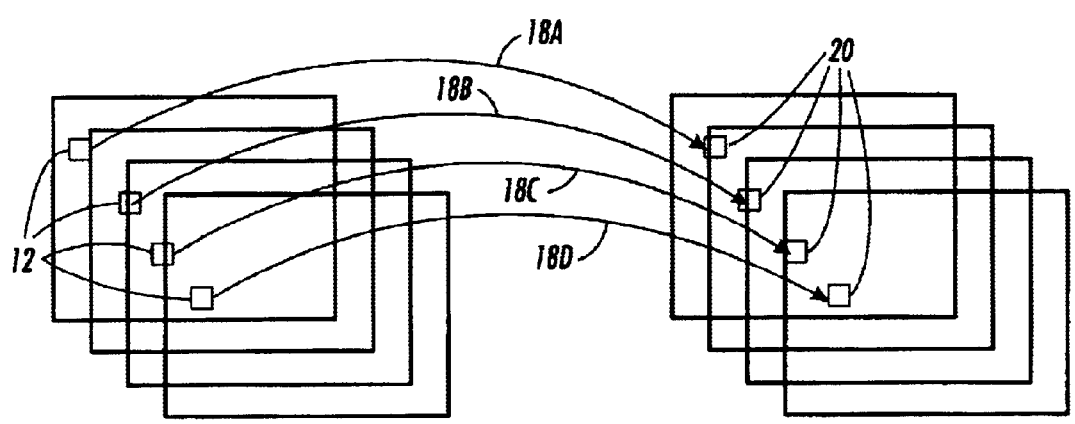
FIG. 2 depicts a simplified conversion from a reference medium to a desired output medium based on a comparison of measured values on each medium.
Figure 3:
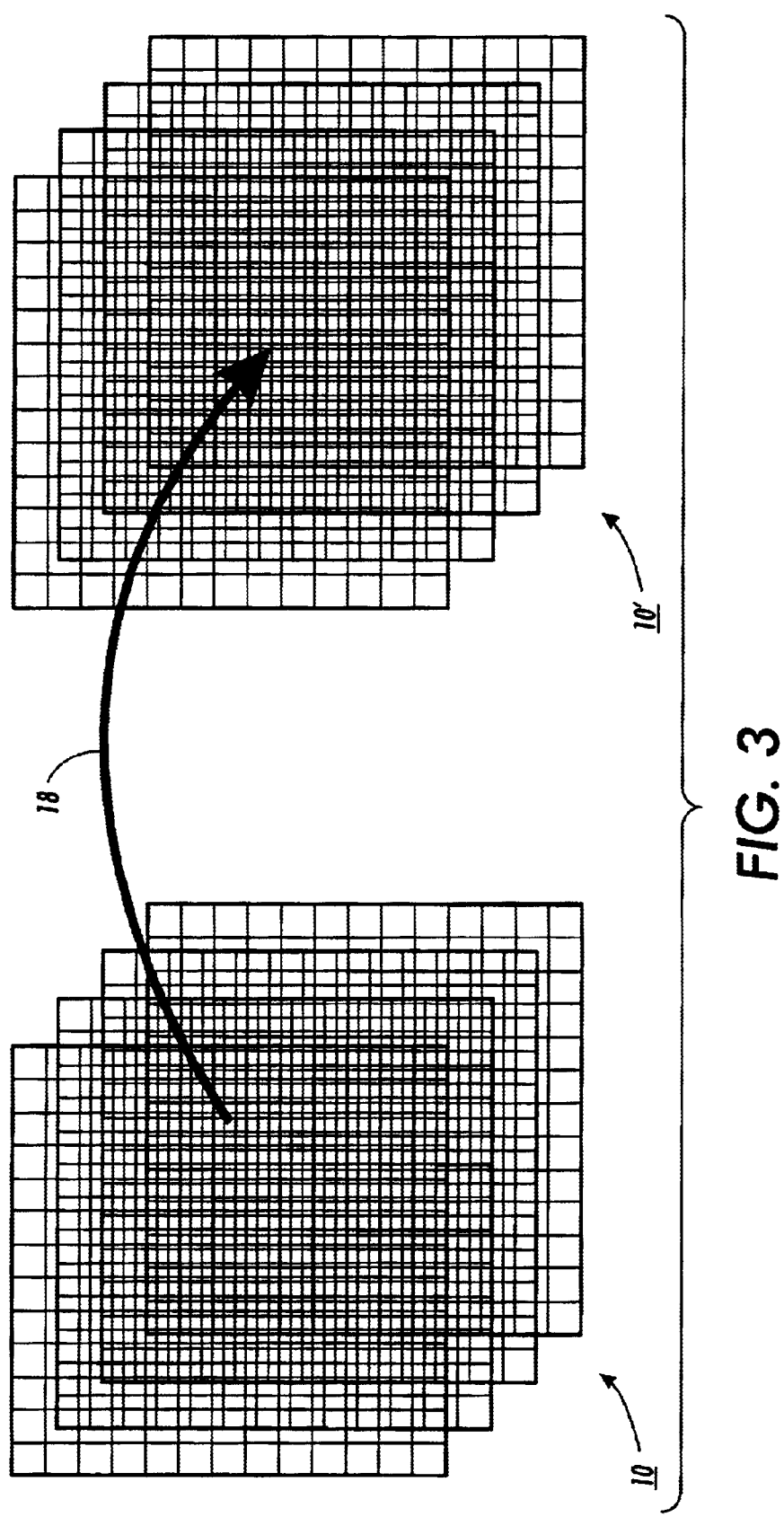
FIG. 3 depicts a complete characterization of a desired medium based on a reference output medium and a relationship therebetween.

With reference now to FIG. 2, measured values 12 from the reference characterization 10 May alternately be used to derive relationships 18a, 18b, 18c, and 18d to known or supplied desired values 20 associated with the desired output medium. Preferably, the relationships 18a–18d are derived for a small subset of the total number of measurements needed for a complete characterization. With reference now to FIG. 3, the relationships 18a–18d are regressed into a relationship 18 which enables spectra on the desired output medium to be estimated based on the complete reference characterization 10'. Those skilled in the art will appreciate that the simplified adjustments discussed above can be easily expanded to include more than the example number of reference patches and/or desired patches shown and discussed above. Moreover, details of the derivation of the relationship will be more fully developed below.

Figure 4:
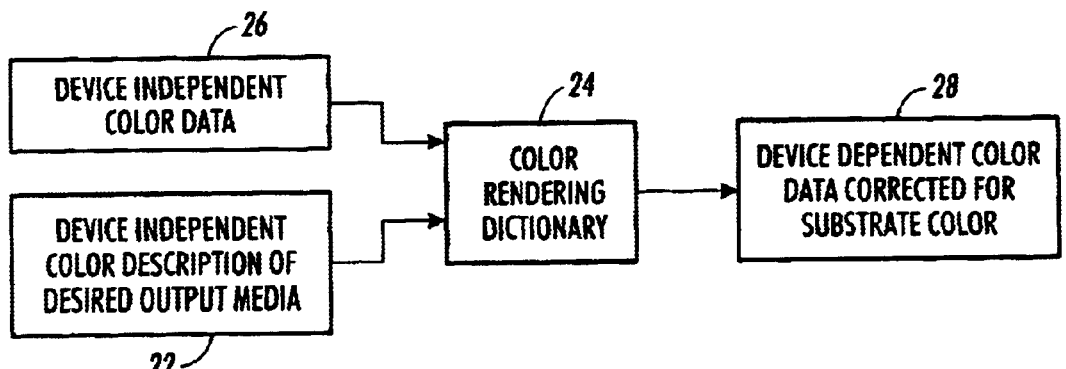
FIG. 4 depicts a simplified conversion from a reference medium's color rendering dictionary to a desired dictionary adjusted for a media WhitePoint.

Referring now to FIG. 4, in another embodiment, a desired output media color description 22 is used as input to an output color table or color rendering dictionary 24. Here, a reference characterization stored in the color table or color rendering dictionary 24 includes associations between device independent color space and device dependent color space (i.e. Lab to CMY) which inherently include an indication of color of the reference substrate (e.g. mediaWhitePointTag). As an example, using the International Color Consortium Profile format, the device independent color information of the desired substrate 22 will be entered as the mediaWhitePointTag. Thus, knowledge of the desired substrate WhitePoint allows color conversion from an input image's color data 26 to the printer's color data 28 modified to assure the printed color will match as closely as possible with the color of the desired output medium.

The Neugebauer Method

The Neugebauer model has been widely used to predict the calorimetric response of halftone color printers. Principles of Color Reproduction, J. A. C. Yule, John Wiley and Sons, Inc., NY, 1967. The original model is essentially an extension of the Murray-Davies equation. The color of a print is predicted as the weighted average of the colors of the printing primaries (e.g., CMYK) and their overprints, where the weights are determined by the relative dot area coverages on the print.

In an example case of CMYK printers, there are 16 basis colors, including white and all possible combinations of the four color mixtures. The 16 basis colors are referred to as the Neugebauer primaries. For a given digital input (C M Y K) with corresponding dot area coverage, the spectral Neugebauer equations predict the average spectral reflectance of a printed patch using $$R_{CMYK(\lambda)} = \left[\sum_{i=1}^{16} w_i \cdot P_{i(\lambda)}^{\frac{1}{n}}\right]^n$$

where $w_i$ represents the weight of each primary (i) calculated using the Demichel dot model equations or other equations appropriate for the halftone dot geometry. R. Balasubramanian, "A printer model for dot-on-dot halftone screens", Proc. SPIE, Vol. 2413, pp. 356–364, 1995. $P_i$ is the reflectance of the (i)th solid color and $R_{CMYK}$ is the predicted patch reflectance. A Yule-Nielsen correction factor (n) is included to account for light scattering within the substrate.

When using the Neugebauer model, it is important that the 16 basis primaries are printed and measured on the substrate to be modeled. Prior knowledge of the Yule-Nielsen (YN) correction factor and dot gain characteristics are also important.

Figure 5:
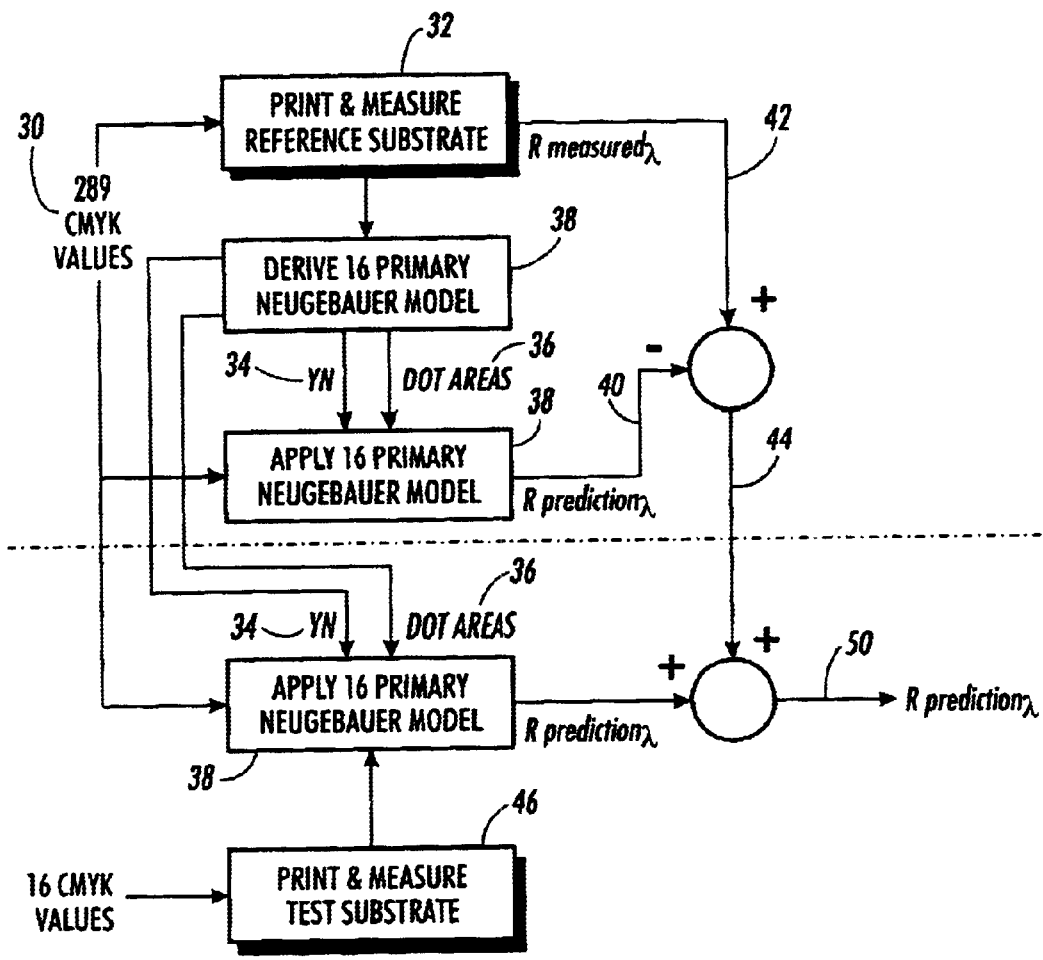
FIG. 5 is a block diagram of a system suitable to practice one embodiment of the present invention.

The diagram shown in FIG. 5 illustrates an exemplary Neugebauer implementation. A set number of CMYK values 30 (289 in the current example) represent the CMYK digital counts corresponding to each patch on an exemplary characterization target. Typically, a user has a printer characterization in place for a reference substrate, or media, stored in a memory 32. Using the measured values from the reference substrate and the corresponding CMYK values, the Yule-Nielsen correction factor (YN) 34 and dot area curves 36 are derived using the basic 16 Primary Neugebauer model 38. The set number of CMYK values (289 in the current example) are then passed back through the model 38, using the derived YN value 34 and dot areas 36 to predict the reflectance or provide a theoretical value of the patches on the reference substrate shown on line 40. The reference prediction is then compared to the actual measured values shown on line 42 and the spectral differences or deltas 44 are calculated.

The 16 basis Neugebauer primaries are then received for the desired new media or substrate illustrated as 46 (e.g. by printing and measuring). Using the YN 34 and dot area parameters 36 derived earlier with model 38 for the reference substrate, the reflectances of all 289 CMYK patches are predicted or theorized on the desired new media 48. Finally, the earlier calculated deltas 44 are added back to the prediction of the desired new media 48 resulting in a prediction or derivation for the new media 50. Those skilled in the art can appreciate that the deltas 44 are used to capture any modeling errors in model 38 that are systemic (and by assumption, substrate independent). This reflectance prediction 50 is then used to generate the characterization for the new substrate.

Those skilled in the art will also appreciate that the use of the deltas 44 may be omitted if they are not significant or for simplicity. In addition, it will be apparent to the same that the final prediction for the new media 50 can also be obtained by adding the difference of the model predictions for the new media and the reference media to the actual measured values on the reference substrate because this scheme is mathematically equivalent to the above described method.

Practitioners appreciate that the use of this technique requires that a minimal set of 16 measurements be made on the new substrate. While this is a considerable savings over a complete recharacterization, it is possible to consider an even more economical approach, wherein a combination of both modeled primaries and Neugebauer equations could be used to predict the new substrate response, thus requiring no measurements on the test substrate. In this case, the primaries can be modeled using Beer's law or Kubelka-Munk theory, which are discussed below. Optical Radiation Measurements: Color Measurement, F. Grum and C. J. Bartleson, Eds., Academic Press, NY, 1983.

Beer's Law

Beer's law states that the absorption of light is proportional to the number of absorbing molecules in its path, it describes simple subtractive colorant mixing on a wavelength by wavelength basis. In this method, it is necessary to measure only the reflectance spectrum of each new paper.

Beer's Law: $t_{(\lambda)}=10^{-\epsilon(\lambda)^{cx}}$ $R_{1(\lambda)}=t_{(\lambda)}^2 \cdot R_{p1(\lambda)}$ $R_{2(\lambda)}=t_{(\lambda)}^2 \cdot R_{p2(\lambda)}$ As shown above, the spectral transmittance ($t_{(\lambda)}$) is considered a function of the wavelength ($\lambda$), extinction coefficient ($\epsilon$), concentration (c) and thickness (x). This allows one to assume that the sample reflectance on each paper ($R_{(\lambda)}$) is a function of the colorant transmittance ($t_{(\lambda)}$) and paper reflectance ($R_{p(\lambda)}$). The equation above can also be written in terms of reflectance, $$R_{2(\lambda)} = \left(\frac{R_{1(\lambda)}}{R_{p1(\lambda)}}\right) \cdot R_{p2(\lambda)}$$

As long as the assumptions hold, a prediction of the reflectance of any color on new substrate ($R_{2(\lambda)}$) is attainable given only the reflectance spectra of a color ($R_{1(\lambda)}$) printed on a known or reference substrate ($R_{p1(\lambda)}$), and the reflectance of the new substrate ($R_{p2(\lambda)}$)

Kubelka-Munk Theory

When a colorant is not transparent, the Beer's law assumptions of zero scattering do not hold. Therefore, a more robust model accounts for a colorant's absorption and scattering properties. This is an important consideration when using the xerographic process. The printer toners are not completely transparent and typically each toner has its own scattering coefficient.

Figure 6:
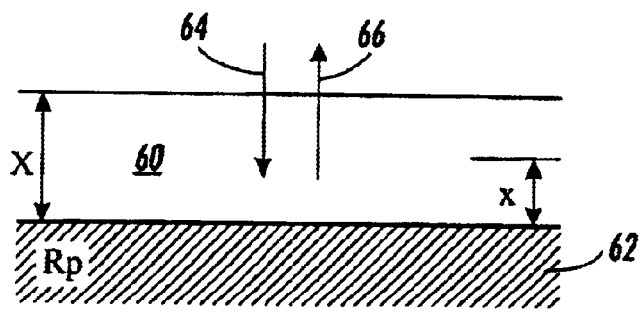
FIG. 6 is an idealized cross section of a sample image on a substrate.

In 1931, Kubelka and Munk derived a color mixing model in which the reflectance and transmittance of a color sample are described with respect to the absorption and scattering ($K_{(\lambda)}$ and $S_{(\lambda)}$) coefficients of the material. As best appreciated by reference to FIG. 6, the model considers an ink or toner film 60 of thickness X, that both absorbs and scatters light passing through it. While the film is known in practice to be rather non-uniform, the film 60 is schematically shown as being plane and uniform. The film 60 is placed in optical contact with a background 62 of reflectance ($R_{p(\lambda)}$); the depth parameter (x) is considered to be zero at the background and X at the illuminated side of the film 60.

The Kubelka-Munk model assumes that the light is scattered in only two directions, up and down as indicated by arrows 64 and 66. The downward channel 66 also contains the original light before it is scattered. Equation 1 below is commonly referred to as the exponential form of the Kubelka-Munk equation:

$$R_{(\lambda)} = \frac{\left(\frac{R_{p(\lambda)} - R_{\infty(\lambda)}}{R_{\infty(\lambda)}}\right) - R_{\infty(\lambda)}\left(R_{p(\lambda)} - \frac{1}{R_{\infty(\lambda)}}\right)\exp\left\{S_\lambda X\left(\frac{1}{R\infty} - R_{\infty(\lambda)}\right)\right\}}{R_{p(\lambda)} - R_{\infty(\lambda)} - \left(R_{p(\lambda)} - \frac{1}{R_{\infty(\lambda)}}\right)\exp\left\{S_\lambda X\left(\frac{1}{R\infty} - R_{\infty(\lambda)}\right)\right\}} \quad [1]$$

The reflected light ($R_{(\lambda)}$) is a function of the paper reflectance ($R_{P(\lambda)}$), the colorant reflectance of a sample at infinite thickness ($R_{28\ (\lambda)}$, the scattering coefficient of the colorant $S(\lambda)$ and the sample thickness X. The parameter $R_{28\ (\lambda)}$ represents the reflectance of an infinitely thick colorant, that is, a thickness such that any further increase in thickness has no effect on the reflectance of the sample. $R\infty(\lambda)$ is directly related to the absorption and scattering coefficients of the colorant, as seen in Equation 2:

$$R_{\infty(\lambda)} = 1 + \frac{K_{(\lambda)}}{S_{(\lambda)}} - \sqrt{\left(\frac{K_{(\lambda)}}{S_{(\lambda)}}\right)^2 + 2\left(\frac{K_{(\lambda)}}{S_{(\lambda)}}\right)} \quad [2]$$

where $K_{(\lambda)}$ is the absorption coefficient. The K and S spectra can be fit to reflectance spectra as a function of wavelength over a series of thickness values using the Kubelka-Munk equation, or by printing the colorants on multiple substrates of known reflectance.

Both Beer's Law and Kubelka-Munk can only predict the reflectance for solid colors and overprints. They must be used in conjunction with another model, such as the previously discussed Neugebauer method, to predict the spectral response of halftone color prints.

Applying Kubelka-Munk Theory

Figure 7:
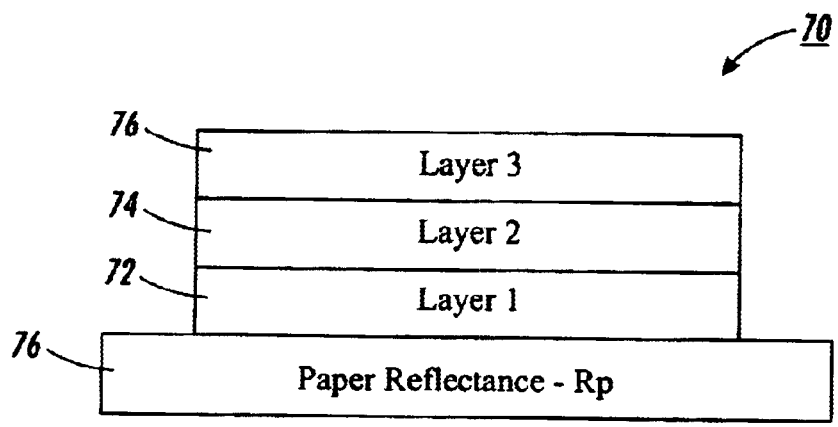
FIGS. 7 and 8 are idealized side elevations of toner layers on imaging media.

Although the use of Kubelka-Munk is relatively straightforward, it requires prior knowledge of many of the parameters for the model to work. However, only four out of the 16 Neugebauer primaries are single colorant solids, while the remaining 11 (excluding white) must be modeled as overprints. As best appreciated by reference to FIG. 7, the Kubelka-Munk model can be used to predict the reflectance of a multiple layer image 70 by treating each predicted layer reflectance as the substrate reflectance of the subsequent layer.

The modeled reflectance spectrum for the first toner layer 72 is then treated as the substrate reflectance spectrum, $R_{p(\lambda)}$, for the next toner layer 74. A multi-layer color may be modeled by repeating the process for each layer in the image 70, resulting in the reflectance spectrum of the multi-layer sample. In order to capture the paper invariant characteristics, this method assumes that the multi-layer approach to modeling the 11 remaining Neugebauer primaries is sufficient and that the K and S properties of each toner are invariant on each substrate 78. Preferably, a $R_{28\ (\lambda)}$ spectrum is available for each toner in the xerographic printer. If $R_{\infty(\lambda)}$, is not available however, accurate K and S spectra for each toner are sufficient.

Procedure

An exemplary procedure used to optimize the model parameters is discussed, step by step, below:

1. The reference characterization target is printed on a reference substrate. Each target patch is measured using a spectrophotometer. An ultra violet filter is preferably used to reduce unwanted UV fluorescence.

2. For each toner, an R∞pellet is made and measured.

3. Taking the exponential form of the Kubelka-Munk equation (Equation [1]) it is possible to consider the reflectance of one colorant as a product of four parameters, namely $R_{p(\lambda)}$, $R_{\infty(\lambda)}$, $S_{(\lambda)}$ and X. Thus, if for each toner, $S_{(\lambda)}$ is constant over different substrates and that X is a scalar value, then the Kubelka-Munk equation is solved in terms of $S_{(\lambda)}X$, or the thickness-scattering coefficient. By rearranging Equation [1]:

$$S_{(\lambda)}X = \ln\left[\frac{\left(\frac{R_{p(\lambda)} - R_{\infty(\lambda)}}{R_{\infty(\lambda)}}\right) - R_{(\lambda)}R_{p(\lambda)} + R_{(\lambda)}R_{\infty(\lambda)}}{(R_{\infty(\lambda)} - R_{(\lambda)})\left(R_{p(\lambda)} - \frac{1}{R_{\infty(\lambda)}}\right)}\right] \cdot \left[\frac{1}{\left(\frac{1}{R_{\infty(\lambda)}} - R_{\infty(\lambda)}\right)}\right] \quad [3]$$

When looking at only one color patch, it is possible to solve exactly for $S_{(\lambda)}X$ for each substrate. Because only one $S_{(\lambda)}X$ spectrum per toner or process colorant is required, least squares minimization can be used to calculate the best fit $S_{(\lambda)}X$ spectra over several training papers. That is, the optimal solution $S_{(\lambda)}X_{opt}$ is the one that minimizes the squared error E between the model prediction $R_{pred(\lambda)}$ and the true measurements $R_{meas(\lambda)}$ on each training paper.

$$E = \sum_{papers\, 1-5} \|R_{meas(\lambda)} - R_{pred(\lambda)}\|^2 \quad [4]$$

$$E = \sum_{papers\, 1-5} \|R_{meas(\lambda)} - f(R_\infty, R_{p(\lambda)}, S_{(\lambda)}X)\|^2$$

where f( ) is given in Equation 1. In order to optimize $S_{(\lambda)}X$ over the training papers in the example, Equation 4 was used as the cost function of a constrained non-linear optimization.

4. Once the best fit $S_{(\lambda)}X$ spectra for each of the toners, or process colorants, has been regressed, they are used to predict the solid colors and overprints.

In order to optimize the spectral prediction of the overprints, a set of thickness attenuation parameters are introduced ($\alpha$, $\beta$, $\gamma$, $\Delta$) to account for multi-layer thickness correction to recognize that a two-layer image is unlikely to have the same thickness as two independent layers added together. The attenuation parameters are not wavelength dependent and account for an overall thickness reduction in each toner layer.

Figure 8:
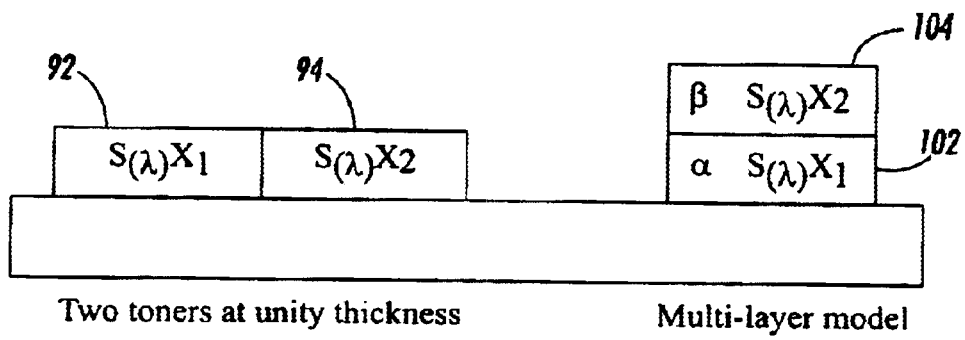

FIG. 8 illustrates how two toner (or colorant) patches 92, 94 at unit thickness can be modeled as $S_{(\lambda)}X_1$ and $S_{(\lambda)}X_2$. When used in a multi-layer model each toner thickness 102, 104 is attenuated by its thickness attenuation parameter, $\alpha$ and $\beta$. For each multi-layer primary, a non-linear optimization is run to optimize the thickness parameters. The optimal solution is the combination of ($\alpha$, $\beta$, $\gamma$, $\Delta$) that minimizes the root mean squared error E between the model $R_{pred(\lambda)}$ and the true measured value $R_{meas(\lambda)}$.

$$E = \sqrt{\frac{\sum_{\lambda=\lambda1}^{\lambda n} (R_{meas(\lambda)} - R_{pred(\lambda)})}{n}} \quad [5]$$

The optimization is repeated for each Neugebauer primary on each of several experimental substrates. An average value is calculated for each primary, for each attenuation parameter from the results of the experimental substrates.

TABLE 1

Thickness attenuation parameters for Red and (Blue + Black) patches on three example substrates

| Solid Red Patch | | | | Solid Blue ' Black Patch | | |
|---|---|---|---|---|---|---|
| | Paper 4 | Paper 8 | Paper 9 | | Paper 4 | Paper 8 | Paper 9 |
| α | 0.6840 | 0.6738 | 0.7315 | α | 0.1784 | 0.1215 | 0.3196 |
| β | 0.8505 | 0.8447 | 0.8919 | β | 0.3206 | 0.2287 | 0.4266 |
| | | | | γ | 0.7498 | 0.7426 | 0.8623 |

Table 1 shows how much the actual thickness attenuation parameters vary from substrate to substrate over an exemplary set of papers. It is apparent that a large amount of variation is present, particularly for the black overprints.

5. Using the optimized $S_{(\lambda)}X$ spectra regressed in step 3, the average optimized attenuation parameters from step 4, and the reflectance of each substrate ($R_{p(\lambda)}$), the multi layer model is used to predict the reflectance spectra of each of the Neugebauer primaries on each substrate.

Figure 9:
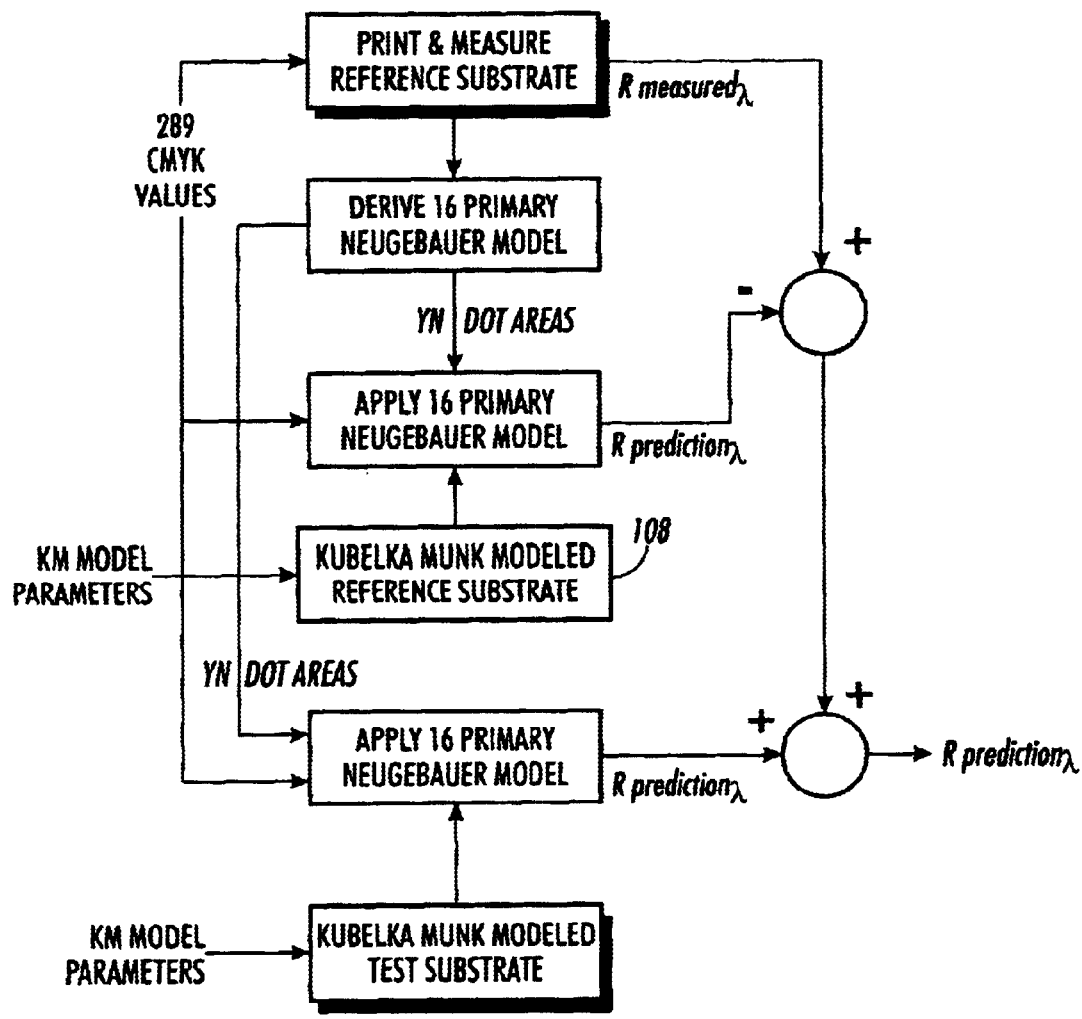
FIG. 9 is a block diagram of a system according to another embodiment of the present invention.

When the primaries have been predicted or theorized for the new substrate, they are used together with the Neugebauer approach documented above to predict the reflectance on the new substrate. Reference to FIG. 9 illustrates a modified Neugebauer approach (FIG. 5). While similar in most respects, when calculating the model prediction of the reference substrate, the reference substrate primaries are taken from the Kubelka-Munk prediction of the reference substrate 108, and not the measured data. This difference is significant from a user viewpoint, as it requires no measurements on a given new test substrate.

Saunderson Correction

To further improve performance, before the Kubelka-Munk or Beer's law is applied, a correction can be made for reflections at the sample surface. A method for making this correction is known, first offered by Saunderson in terms of two parameters, $k_1$ and $k_2$, describing the fractional reflectance when light entering and exiting a sample is partially reflected at the interface. The original integrating-sphere model can be extended to take into account bi-directional (0/45 or 45/0) measurement geometries, by the addition of a third parameter, $k_0$:

$$R_{corr(\lambda)} = \frac{(R_{meas(\lambda)} - k_0)}{1 - k_1 - k_2 + k_1k_2 - k_0k_2 + R_{meas(\lambda)}k_2}$$

Principal Component Analysis

Instead of using model based approaches, an alternative uses an empirical technique such as principal component analysis (PCA). Principal component analysis is a mathematical technique that describes a multivariate set of data using a small number of derived basis vectors. Essentially PCA reduces the dimensionality of the original data, where the principal components of the multivariate set of data are computed from the scalars and eigenvectors of either the sample correlation or sample covariance matrix.

Each basis vector is formulated using specific linear combinations of the original variables, accounting for as much variance in the original data set as possible. In seeking a linear combination with maximal variance, one is essentially searching for a dimension along which the observations are maximally separated or spread out.

The usefulness of principal component analysis in multivariate data is evident. An n-dimensional geometrical model formed from the sample data can be considered the 'true' picture of the data set. If we wish to obtain the 'best' r (<n) dimensional representation of the original n-dimensional 'true' picture, then we can project the points into the r-dimensional subspace defined by the first r principal components $Y_1, Y_2, \ldots, Y_r$.

As detailed below, this technique enables a low dimensional approximation, using only a few dimensions, to a set of high-dimensional multivariate data.

Applying Principal Component Analysis

When dealing with spectral data one is essentially dealing with a 36-dimensional space for each measured color, assuming 380–730 nm sampling with 10nm interval. This is obviously a high dimensionality that would well serve a reduction in dimensionality.

If one considers measuring an entire characterization target on one substrate, one would expect the main contributions to variance within the data set to come from the substrate absorption spectrum, the CMYK toner absorption spectra, the CMYK toner scattering spectra and cross toner interactions.

If one wishes to separate out the dimensionality to only account for the toner absorptions and cross-toner interactions one must first distinguish which vectors represent the variance accounted for by the substrate absorptions. As has been seen with previous models this is not a simple problem, and is cause for concern when trying to predict one substrate's reflectance characteristics from another's.

Instead, one can take an alternative approach of accounting for the paper absorptions using an existing model, such as Beer's law to normalize the reflectance spectra to the substrate white, prior to running a multivariate analysis technique. Accordingly this assumes that the major source of variance within the normalized reflectance spectra will come from the absorption and scattering properties of the xerographic toners and any cross toner interactions.

It is not wise though to assume that all substrate dependency will have been accounted for by the normalization, other artifacts may well contribute to the substrate dependencies that cannot be accounted for. Instead, an example approach assumes that the 'other' substrate dependency contributions are of little significance compared to the toner properties, and that these contributions will be confined to principal components accounting for the least variance.

One should also consider that toner absorption, scattering and cross-toner interaction properties would likely not be constant from substrate to substrate. Each property will be present, but will constitute a different amount of variance within the data set.

These are some important considerations that must be taken into account for an empirical technique, such as principal component analysis, to capture the change in substrate properties.

Procedure

Figure 10:
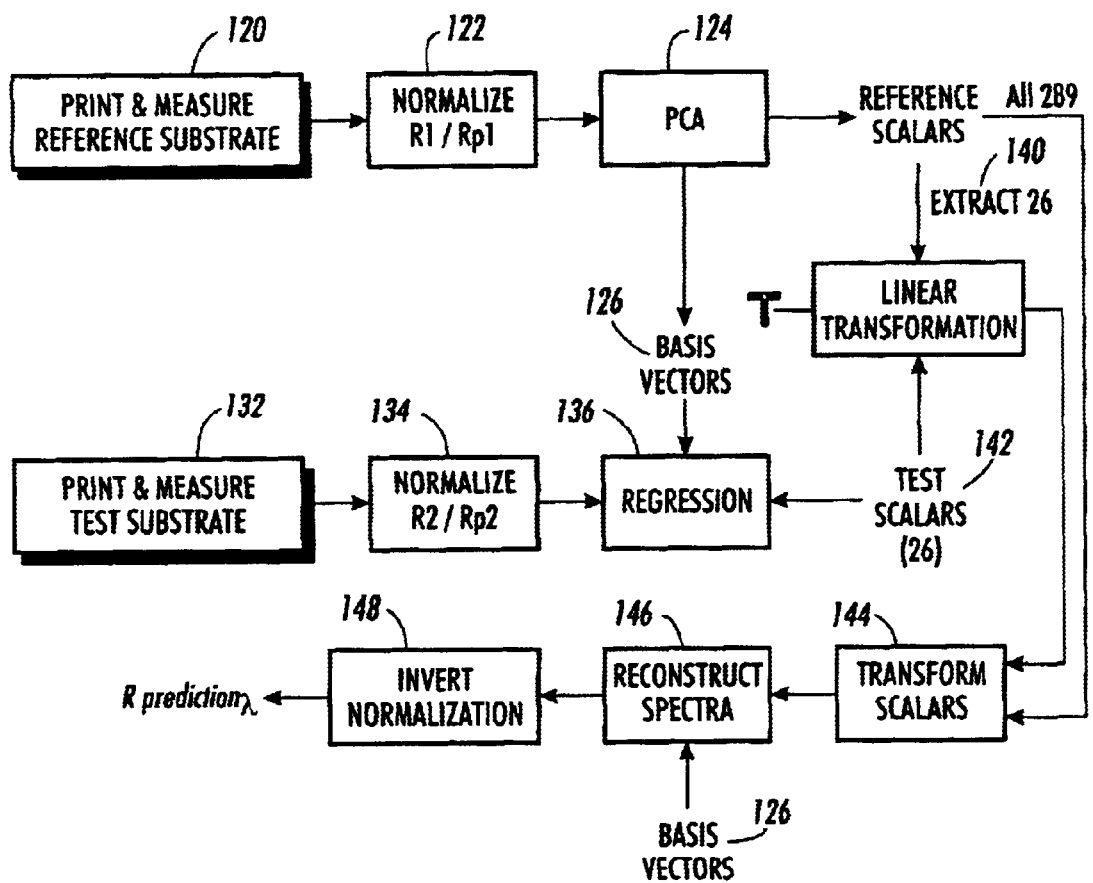
FIG. 10 is a block diagram of a system suitable to practice another embodiment of the present invention; and, FIG. 11 is an idealized cross section of toner layers on a textured output media.

A flow diagram shown in FIG. 10 summarizes the stages sufficient to practice this aspect of the present invention. In step 120 the characterization target is printed on a substrate, the patches measured and a characterization generated. This substrate is considered the reference substrate to which all new substrate characterizations will be derived.

In step 122 the measured reflectance spectra for each patch can then be normalized using a Beer's law assumption as shown:

$$R_{normalized(\lambda)} = \frac{R_{measured(\lambda)}}{R_{paper(\lambda)}}$$

In step 124 principal component analysis is then run on the normalized patch spectra, yielding a set of basis vectors 126 that describe the spectral characteristics on that substrate. Of the exemplary 36 basis vectors calculated by the principal component analysis, a smaller subset is used. In order to determine the number of vectors required, an experimental iterative algorithm was run to calculate the reconstruction accuracy vs. number of basis vectors used for several different substrates. Results are shown in Table II below:

| # Vectors | Paper 1 | Paper 3 | Paper 7 | Paper 11 |
|---|---|---|---|---|
| 1 | 19.6831 | 20.0577 | 20.4572 | 20.4411 |
| 2 | 14.0097 | 13.9687 | 14.4645 | 14.4148 |
| 3 | 4.5525 | 2.6744 | 3.1983 | 3.0807 |
| 4 | 3.8469 | 1.6457 | 2.2156 | 2.1114 |
| 5 | 0.5938 | 0.4471 | 0.4779 | 0.4914 |
| 6 | 0.5558 | 0.2508 | 0.3069 | 0.3247 |
| 7 | 0.5667 | 0.1815 | 0.2329 | 0.2629 |
| 8 | 0.2598 | 0.1417 | 0.1506 | 0.1534 |
| 9 | 0.2314 | 0.0816 | 0.1227 | 0.1016 |
| 10 | 0.0572 | 0.0491 | 0.0548 | 0.0638 |
| 11 | 0.0428 | 0.0459 | 0.0565 | 0.0628 |
| 12 | 0.0462 | 0.0323 | 0.0473 | 0.0436 |
| 13 | 0.05 | 0.043 | 0.0458 | 0.0465 |
| 14 | 0.0361 | 0.0449 | 0.0199 | 0.015 |
| 15 | 0.0319 | 0.042 | 0.0106 | 0.0139 |
| 16 | 0.0297 | 0.0084 | 0.0144 | 0.0106 |
| 17 | 0.0055 | 0.0014 | 0.0046 | 0.0025 |
| 18 | 0.003 | 0.0008 | 0.0013 | 0.0029 |
| 19 | 0.0029 | 0.0008 | 0.0011 | 0.0019 |
| 20 | 0.0014 | 0.0006 | 0.0011 | 0.0019 |

Table II shows the reconstruction error (DeltaE 94) each paper's self prediction using n principal component basis vectors. The decrease in error can be seen at 10 and 17 vectors. It is clear to see that the higher the number of basis vectors used to reconstruct, the lower the reconstruction error. The error metric used was CIE deltaE 94 between the original spectral measurements on the reference substrate, versus the reconstructed spectral measurements on the reference substrate.

It is evident from Table II that significant jumps in improvement in reconstruction accuracy occur when 10 or 17 basis vectors are used. Weighing the fact that too many basis vectors may start modeling the noise within the prints, we prefer the use of ten basis vectors to perform the spectral reconstruction.

In step 132 a smaller subset of 26 patches can then be printed on the new or desired substrate and measured. The choice of patches included the 16 Neugebauer basis primary colors and 10 patches to obtain the tone reproduction characteristics on the new substrate. The 10 patches consist of Cyan, Magenta, Yellow, Black and C=M=Y, of approximately 35% and 70% tonal value. In order to determine the optimal number of patches to use, an iterative algorithm was run to compare the reconstruction accuracy across papers versus the number of training patches used. This is discussed more fully below.

In step 134 the measured reflectance spectra for each patch can then be normalized using a Beer's law assumption, as shown above in step 122.

In step 136 the ten basis vectors 126 and the normalized test substrate reflectance spectra from 134 are regressed to obtain test substrate scalars from the normalized data. Basis vectors are not derived for the new substrate because experimentation has shown that the first 10 basis vectors of the reference substrate also serve as a good set of basis vectors for all test substrates. An added advantage of using the reference substrates basis vectors is that they will be much smoother than that of the test substrate, due to the higher number of samples used in deriving the reference basis vectors.

26 patch scalars 140 corresponding to the same CMYK values as the test patches 132 are extracted from the reference set of 289 scalars regressed in 124. These scalars 140, along with the corresponding 26 patch scalars 142 regressed in 136, are used to derive a transformation between the two sets of scalars by linear regression. Given the reference scalars X, and the test scalars Y the linear transform is given by:

$Y = X^T \cdot T$ To solve for T;

$T = (X \cdot X^T)^{-1} \cdot X \cdot Y$ where T is the transformation and $\lfloor (X \cdot X^T)-1 \cdot X \rfloor$ is the pseudo-inverse of the reference substrates scalars. Several methods exist in linear algebra for computing the pseudo-inverse of a matrix. We utilized the singular value decomposition, as this is one of the most numerically robust techniques.

Using the transformation matrix and the 289 sets of scalars from the reference substrate, the scalars are transformed into new 'pseudo-scalars' for the second substrate in step 144.

A normalized spectral reconstruction of the test substrate is then computed using the referenced basis vectors and the pseudo-scalars in step 146 which is then inverted as shown in 148 by:

$R_{predicted(\lambda)} = R_{normalized(\lambda)} \cdot R_{paper(\lambda)}$

These predicted spectra are then used for deriving a color correction table for the test substrate using standard techniques.

Non-Planar Model

Figure 11:
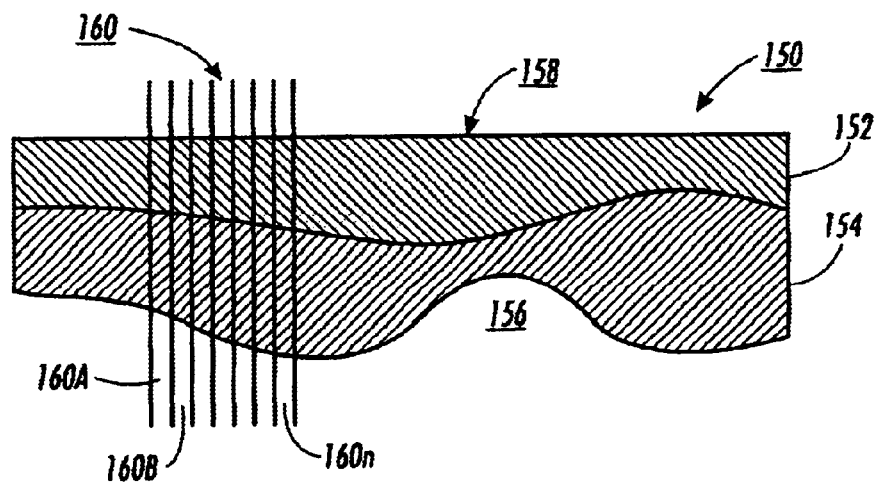

Both the Beer's law and the Kubelka-Munk model assume that the colorant is uniformly distributed in an image intended to be of uniform color. In practice, the cross-section of xerographic images is typically quite non-uniform on a microscopic scale, even on smooth substrates. The non-planarity of the toner layers is aggravated by rough substrates. This is schematically illustrated in FIG. 11 for a two-layer image 150. Layers of toner 152, 154, e.g., magenta and yellow toner layers in a red image overlie a rough substrate 156. Typically, a well-fused image 150 has a smooth surface 158. By comparing FIG. 11 with FIG. 7, those skilled in the art can appreciate that some errors can be introduced by the non-uniformity of toner layers.

A more accurate model for the color of a xerographic image can be obtained by taking the non-planar nature into account. One approach is to mathematically divide the image in the horizontal plane into small sections 160, so that each section 160a, 160b . . . can be closely approximated by the usual planar model. The overall image color is then calculated by integrating the reflectance of each planar section 160a, 160b . . . over the appropriate range of layer thicknesses. The layer thickness variation can be represented by a distribution, such as a Gaussian distribution, with a variance which is determined by the substrate roughness as well as xerographic parameters (toner size, development uniformity, fuser setup).

Other Variations Between Substrates

Aside from color variations between substrates, the present invention is also configured to adjust for variables such as texture, weight, and the like. The texture, for example, of the desired media can be supplied by an operator providing identifying data to the printer. Alternately, the printer could be configured with a device to automatically sense the texture directly, or to determine the identity of the media in use through a coding mechanism such as glyphs or barcodes on the media itself. If the chosen paper is significantly rougher or smoother than the original paper used in the characterization, compensation for paper roughness can be done by using the non-planar version of the Kubelka-Munk model, described above. The variance of the toner thickness distribution parameter is adjusted according to the paper texture.

Differences in paper weight, between the desired paper and the original paper used in the characterization, change the heat sink load to the fuser, causing changes in image gloss and color. This can be compensated by adjusting the fusing subsystem, preferably the fuser temperature. The relationship between paper weight and optimum fuser temperature is stored in memory, and can take the form of either a mathematical formula or a look-up table.

The fuser change can be made automatically when the customer selects the paper. Paper weight data, for all papers approved for that printer, could be stored in memory and recalled when the paper is selected. Alternatively, paper weight can be determined automatically with a built-in sensor.

The invention has been described with reference to the preferred embodiments. Modifications and alterations, such as storing more than one reference media, manually determining values for variables associated with the desired media, labeling desired media with information defining the variable, determining values for the variables "on the fly" and the like, will become apparent to those skilled in the art upon reading and understanding the present application. We intend that the invention be construed as including all modifications and alterations insofar as they come within the scope of the appended claims, or the equivalents thereof.

Having thus described the preferred embodiments, we now claim:

1. A method of adjusting a printing device in response to a variable property of an output medium comprising:

storing a reference characterization of at least one measured value associated with a reference output medium;

determining an output value adjusted for the variable property of a desired output medium based on data including the reference characterization of the reference output medium, including:

calculating a theoretical value based on the reference output medium, deriving a relationship between the calculated theoretical value and a corresponding measured value from the stored reference characterization, including:

deriving a reference Neugebauer model to predict the printer response on the reference output medium, wherein the Neugebauer model includes an appropriate Yule-Nielsen parameter for the reference output medium, and spectra of selected Neugebauer primaries for the reference output medium, deriving a desired Neugebauer model to predict the printer response on the desired output medium, wherein the Neugebauer model includes an appropriate Yule-Nielsen parameter for the desired output medium, and spectra of selected Neugebauer primaries for the desired output medium, applying said reference Neugebauer model to generate a set of calibration values for the reference output medium; and, applying said desired Neugebauer model to generate a set of calibration values for the desired output medium;

applying the relationship derived to a theoretical value for the desired output medium, thereby obtaining the output value; and, based on the step of applying the desired Neugebauer model, marking the desired output medium using the determined output value.

2. The method as set forth in claim 1, where the deriving a desired Neugebauer model step comprises retrieving stored spectral data associated with the desired output medium.

3. The method as set forth in claim 1, where the deriving a desired Neugebauer model step comprises measuring the desired output medium to determine spectral data.

4. The method as set forth in claim 1, where the deriving a desired Neugebauer model step comprises calculating the spectra of the selected Neugebauer primaries for the desired output medium using a relationship including Beers Law.

5. The method as set forth in claim 1, where the deriving a desired Neugebauer model step comprises calculating the spectra of the selected Neugebauer primaries for the desired output medium using a Kubelka-Munk model including information related to a set of process colorants.

6. The method as set forth in claim 5, where the Kubelka-Munk model is further refined to a non-planar model, by integrating a toner thickness parameter over a distribution with a variance determined from the reference medium.

7. The method as set forth in claim 5, wherein the variable further includes texture and the deriving step comprises integrating a toner thickness parameter over a distribution with a variance determined from a texture of the desired output medium.

8. The method as set forth in claim 5, further comprising applying a correction for front surface reflection of the desired output medium.

9. The method as set forth in claim 1, where the deriving a desired Neugebauer model step comprises measuring the spectra of the selected Neugebauer primaries on the desired medium.

10. The method as set forth in claim 1, wherein the output value includes a fuser temperature determined to fuise colorants to the desired output medium.

11. A method of adjusting a printing device in response to a variable property, including at least one of color or weight of an output medium comprising:

storing a reference characterization, including measurements of a number of reference patches associated with the reference output medium;

deriving a relationship between a set of desired output values associated with the desired medium and a set of analogous values from the reference characterization for the reference output medium by;

calculating basis vectors from said reference characterization for the reference output medium;

applying the relationship derived to the reference characterization, thereby adjusting the reference characterization to the desired output medium; and, based on the applying step, marking the desired output medium using the determined output value.

12. The method as set forth in claim 11, wherein the deriving step further comprises:

regressing a subset of said basis vectors against said reference characterization, thereby obtaining a set of reference scalars required to reconstruct each reference patch;

regressing a set of desired scalars from spectral values of a number of desired patches on the desired output medium and the calculated basis vectors; and, deriving a transform between said set of reference scalars and said set of desired scalars.

13. The method as set forth in claim 12 where the applying step comprises:

transforming said reference scalars into pseudo-scalars for said desired output medium;

estimating spectra of selected desired patches on the desired substrate using said basis vectors and said pseudo-scalars; and, obtaining a characterization for said desired output medium based on said estimated spectra.

14. A method of adjusting a printing device in response to a variable property of an output medium comprising:

storing a reference characterization of at least one measured value associated with a reference output medium;

determining an output value adjusted for the variable property of a desired output medium including;

receiving at least one of a device independent color or weight description of the desired output medium; and, substituting the received at least one device independent color or weight description of the desired output medium into an output color table, a color rendering dictionary, or a table or memory storing weight data including reference medium data; and, Based on the substituting step, marking the desired output medium using the determined output value.

15. An image production system comprising:

a storage element which stores a complete reference characterization including white point data of a reference medium;

a receiving element which receives a value associated with a property of a desired medium; and, a processor in operative communication with said storage elements and said receiving element, wherein:

said processor determines an adjusted output value based on data including at least a portion of the reference characterization and the value associated with the property of the desired medium.

16. The image production system as set forth in claim 15, wherein said processor comprises a calculation element which calculates a theoretical value based on the reference medium and derives a relationship between the calculated theoretical and a corresponding measured value from the stored reference characterization.

17. The image production system as set forth in claim 15, wherein said processor comprises a calculation element which derives a relationship between a set of measured values associated with the desired medium and a set of analogous values from the stored reference characterization.

18. The image production system as set forth in claim 15, wherein said receiving element receives spectral data for the desired medium measured by the system.

19. The image production system as set forth in claim 15, wherein said receiving element receives spectral data for the desired medium entered by a user.

* * * * *